(12) United States Patent
Kawaguchi et al.

(10) Patent No.: US 7,308,478 B2
(45) Date of Patent: Dec. 11, 2007

(54) COMMUNICATION TERMINAL, SERVER UNIT, MAIL INCOMING NOTIFICATION METHOD AND SYSTEM, AND MAIL SENDING AND RECEIVING METHOD

(75) Inventors: Sachiko Kawaguchi, Tokyo (JP); Hidenori Ishii, Tokyo (JP); Hiroshi Uranaka, Tokyo (JP); Masahide Morozumi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 715 days.

(21) Appl. No.: 10/254,017

(22) Filed: Sep. 25, 2002

(65) Prior Publication Data

US 2004/0059787 A1    Mar. 25, 2004

(51) Int. Cl.
    *G06F 15/16* (2006.01)
(52) U.S. Cl. .................. 709/206; 709/203; 709/205; 709/207; 709/224
(58) Field of Classification Search .............. 709/206, 709/207, 203, 224
See application file for complete search history.

(56) References Cited

U.S. PATENT DOCUMENTS

| | | | | |
|---|---|---|---|---|
| 6,108,688 | A * | 8/2000 | Nielsen | 709/206 |
| 6,199,103 | B1 * | 3/2001 | Sakaguchi et al. | 709/206 |
| 6,289,372 | B1 * | 9/2001 | Vyaznikov | 709/206 |
| 6,507,866 | B1 * | 1/2003 | Barchi | 709/207 |
| 6,556,666 | B1 * | 4/2003 | Beyda et al. | 379/88.12 |
| 6,617,969 | B2 * | 9/2003 | Tu et al. | 340/517 |
| 6,650,890 | B1 * | 11/2003 | Irlam et al. | 455/412.1 |
| 6,721,784 | B1 * | 4/2004 | Leonard et al. | 709/206 |
| 6,965,917 | B1 * | 11/2005 | Aloni et al. | 709/206 |
| 6,999,993 | B1 * | 2/2006 | Shah et al. | 709/207 |

FOREIGN PATENT DOCUMENTS

JP    11-252160    9/1999

* cited by examiner

*Primary Examiner*—Michael Won
(74) *Attorney, Agent, or Firm*—Browdy and Neimark, PLLC

(57) ABSTRACT

An attempt is made to make an incoming notification for a reply to sending mail, an incoming notification related to the sending mail, and an incoming notification from an Internet service provider to a user. Accordingly, when the mail is sent from a communication terminal, if an incoming notification condition related to the mail is added and the mail is sent to a server unit, the server unit detects and registers the information as the incoming notification condition and sends the mail to the Internet. Further, when the mail that matches the incoming notification condition was received, the incoming notification is made to the communication terminal and the condition is changed. Consequently, the incoming notification condition can dynamically be set and changed at mail sending and receiving. That is, the incoming notification condition related to the sending mail can be registered in the server unit at mail sending. When the mail that matches the incoming notification condition was received, the mail is posted to the user as the incoming notification and the incoming notification condition can be changed.

24 Claims, 13 Drawing Sheets

Fig. 3

```
Date:Fri,24 Mar 2000 05:33:45 +0900(JST)

From:foo@test.or.jp
To:bar@xxx.or.jp
Subject:mail subject

X-Reply-Push:ON/OFF
------------------------------------------------
TEXT
```
0201 EXAMPLE OF HEADER OF SENDING MAIL
(COMMUNICATION TERMINAL)

```
Date:Fri,24 Mar 2000 05:33:45 +0900(JST)
Message-Id:<200003232033.FAA14305@test.or.jp>

From:foo@test.or.jp
To:bar@xxx.or.jp
Subject:mail subject

------------------------------------------------
TEXT
```
0202 EXAMPLE OF HEADER OF SENDING MAIL
(SERVER UNIT)

```
Date:Fri,24 Mar 2000 05:33:45 +0900(JST)
Message-Id:<200003232033.FAA14305@test.or.jp>

From:foo@test.or.jp
To:bar@xxx.or.jp
Subject:mail subject

In-Reply-To:<200003232033.FAA14305 @test.or.jp>
Reference:<200003232033.FAA14305 @test.or.jp>
------------------------------------------------
TEXT
```
0203 EXAMPLE OF HEADER OF RETURN MAIL

Fig. 4

| USER ADDRESS | TELEPHONE NUMBER | SENDING DATE AND TIME | TITLE | DESTINATION ADDRESS | MESSAGE ID |
|---|---|---|---|---|---|
| foo@testor.jp | 01-1234-5678 | 2000/3/10 13:01 | mail subject | bar@xxx.co.jp | 200003232033.FAA14305@test.or.jp |
| buu@testor.jp | 03-2234-5678 | 2000/3/12 12:00 | test | fuu@yyy.co.jp | 20000432035l.FAA23445@test.or.jp |
| | | 03-2234-5678 | | | |
| ... | ... | ... | ... | ... | ... |

0301 0302 0303 0304 0305 0306

COMMUNICATION TERMINAL, SERVER UNIT, MAIL INCOMING NOTIFICATION METHOD AND SYSTEM, AND MAIL SENDING AND RECEIVING METHOD

BACKGROUND OF THE INVENTION

1. Field of the Invention

The present invention relates to a communication terminal, a server unit, and a mail incoming notification system that make an incoming notification of electronic mail.

2. Description of Prior Art

Conventionally, a general user, for example, a user whose terminal is not connected to a LAN sent and received electronic mail (hereinafter referred to as mail) via the Internet by entering into a contact with an Internet service provider, and connecting a communication terminal, such as his or her own personal computer, to the Internet service provider via public networks. That is, to know mail incoming as well, the general user had to check whether the mail arrives at his or her own mailbox of a mail server in an Internet service provider by connecting the communication terminal to the Internet service provider via public networks. When the user cannot connect the communication terminal to the Internet service provider through this method, the user cannot know the arrival even if important mail arrives. Accordingly, there was a high possibility of corrective action being delayed.

Hereupon, in recent years, a mail incoming notification system described in Japanese Patent Disclosure No. 11-252160 has been known. In the invention described in Japanese Patent Disclosure No. 11-252160, the user previously sets a condition for a Internet service provider using browser software or the like, and makes an incoming notification to the user's communication terminal when the mail that the Internet service provider received matched the condition. FIG. 1 shows the block diagram. FIG. 1 shows a portable terminal unit that the user carries with him or her and on which a mail sending and receiving application is mounted, a communication terminal, such as a personal computer, and an Internet service provider, for example, a provider having a server unit that distributes the mail received from the Internet to the communication terminal connected to public networks and sends the electronic mail sent from the communication terminal to public networks to the Internet. A communication terminal 1301 has an input means 130101 that accepts input of a keyboard or a mouse, a condition setting means 130102 for setting a mail incoming notification condition for a provider, a mail sending means 130103 that sends mail, a mail receiving means 130104 that receives the mail, and a connection means 130105 that connects the communication terminal to the Internet service provider via public networks. An Internet service provider 1305 who performs mediation between public networks and the Internet connection and manages and stores the mail received via the Internet is constituted of a Web server 1304, a condition management server 1303, and a mail server 1302, and a network, such as a LAN (Local Area Network), is connected among them.

The Web server 1304 has a condition storage means 130401 that receives an incoming notification condition set via software, such as browser, from the communication terminal 1301 and stores it in a condition management database. The condition management server 1303 has a condition management database 130301 that manages user information on public networks, such as users' telephone numbers, and the incoming notification condition, such as a mail sender (From). The mail server 1302 has a receiving means 130202 that stores the mail received via the Internet in a mailbox 130205, a decision means 130203 that acquires the incoming notification condition of a destination user from the header of receiving mail and decides from the condition management database 130301 that the condition matches, an incoming notification means 130204 that accepts the decision result and actually makes an incoming notification to the destination user, a distribution means 130206 that distributes the mail to the user, and a sending means 130201 that sends the mail.

The operation will be described. First, the operation when a mail incoming notification condition is registered from the communication terminal 1301 into the Internet service provider 1305 is described. The user starts up software, such as browser, from the input means 130101, such as a keyboard, and connects the communication terminal to the Web server 1304 via public networks using the connection means 130105. Further, the mail incoming notification condition, for example, the mail sender (From) is input from the input means 130101 and the condition is sent to the Web server 1304 using the condition setting means 130102. The Web server 1304 stores the condition in the condition management database 130301 of the condition management server 1303 using the condition storage means 130301. This operation sets the incoming notification condition for the condition management database 130301 of the Internet service provider 1305.

Subsequently, the case where the Internet service provider 1305 receives mail via the Internet and issues an incoming notification to the communication terminal 1301 is described. When the mail server 1302 receives the mail via the Internet using the receiving means 130202 and stores it in the mailbox 130205, a destination address is extracted from the header of the receiving mail by the decision means 130203 and the incoming notification condition for the destination address and user information, such as telephone numbers over public networks, are acquired from a condition management database. Further, it is matched whether the incoming notification condition acquired by the decision means 130203 is provided in the receiving mail header. If the condition does not match, no incoming notification is made. When the condition matches, an incoming notification is made to the communication terminal 1301 of the destination address via public networks using the user information by the incoming notification means 130204.

If a provider receives the mail that matches the incoming notification condition set from the user in this manner, the mail incoming notification is sent to the communication terminal 1301 as far as the condition is not changed.

In the invention described in Japanese Patent Disclosure No. 11-252160, unlike the connection to the Internet service provider at mail sending and receiving, connection is made and a condition is set using browser. For example, if the connection is made to the provider and a certain sender (From) is previously set as the condition using the browser, the setting was a static condition setting that an incoming notification is made each time the sender mail that matches the condition is received as far as the condition is not changed. However, to set the mail related to the sending mail, for example, a reply as the incoming notification condition, a message ID is necessary as the only condition for settling it. The message ID is assigned by a mail server or communication terminal at mail sending. Accordingly, in the invention described in Japanese Patent Disclosure No. 11-252160, after the mail is sent, the message ID could not be registered as the incoming notification condition unless a means for acquiring the message ID and a means for registering it as the incoming notification condition are provided.

Consequently, in the invention described in Japanese Patent Disclosure No. 11-252160, there was a problem that although a static condition setting can be realized, such a dynamic condition setting linked with mail sending and receiving is disabled that sets the incoming of the mail that is related closely to sending mail, for example, a reply to a piece of mail as an incoming notification condition when it is sent and makes an incoming notification and resets a condition when the corresponding reply was received. Further, in Japanese Patent Disclosure No. 11-252160, there was also a problem that an incoming notification is enabled only with the receiving of the mail for a contract user from the Internet and the contents that an Internet service provider ought to post to the user, for example, system fault detection and maintenance information cannot be post spontaneously as the incoming notification.

An object of the present invention is to provide a communication terminal, a server unit, and a mail incoming notification system that make an incoming notification of the mail that is related closely to sending mail, such as solving this and other problems and making the incoming notification for a reply to the sending mail, and that can post the contents that an Internet service provider ought to post to the user as the incoming notification.

SUMMARY OF THE INVENTION

To solve this and other problems, in a first aspect of the invention when a communication terminal sends the mail, if an incoming notification condition related to the mail is added and the mail is sent to a server unit, the server unit detects and registers the information as the incoming notification condition and sends the mail to the Internet. Further, when the mail that matched the incoming notification condition is received, an incoming notification is made and the incoming notification condition is changed (including deletion). Accordingly, the incoming notification condition can dynamically be set and changed at mail sending and receiving, that is, the incoming notification condition related to sending mail can be registered in the server unit at mail sending. Further, when the mail that matches the incoming notification condition was received, the mail is posted to the user as the incoming notification and the incoming notification condition can be changed.

In a second aspect of the invention, an incoming notification condition is nullified when the mail that corresponds to the condition cannot be received after the condition is registered in the first invention even if a fixed time or more elapses. Accordingly, in a mail incoming notification system having the upper limit in a memory that stores an incoming notification condition, if the mail that corresponds to the incoming notification condition cannot be received, the memory of the incoming notification condition is kept being allocated and the system memory can be prevented from running short.

In a third aspect of the invention, the number of incoming notification conditions is managed when an incoming notification condition is registered in the first invention, and, if the number of registered conditions when the incoming notification condition is registered as is, performs processing to prevent it. Accordingly, the capacity of the memory that stores the incoming notification condition of the mail incoming notification system can be determined.

In a fourth aspect of the invention, reference and change of the incoming notification condition set in the first invention are carried out. Accordingly, such a change as the incoming notification condition that was added at mail sending is referred to or deleted from a communication terminal can flexibly be operated.

A fifth aspect of the invention indicates the incoming notification condition of the first invention is a reply to sending mail. Accordingly, the user can certainly receive an incoming notification for the reply to the sending mail.

In a sixth aspect of the invention, the contents that an Internet service provider ought to post to a contract user, for example, the contents of high urgency, such as a system fault and maintenance as an incoming notification. Accordingly, the user can know by receiving the incoming notification that there are the contents the Internet service provider ought to post even except the mail received from the Internet.

The above-mentioned object and advantage of the present invention will be more evident according to the following embodiments described with reference to the drawings.

BRIEF DESCRIPTION OF THE DRAWINGS

FIG. 3 is a block diagram showing an example of a mail header in the mail incoming notification system of the present invention;

FIG. 4 is a drawing showing an example of a table held in a condition management database in the mail incoming notification system of the present invention;

DESCRIPTION OF THE PREFERRED EMBODIMENTS

Embodiment 1

Figure 1:
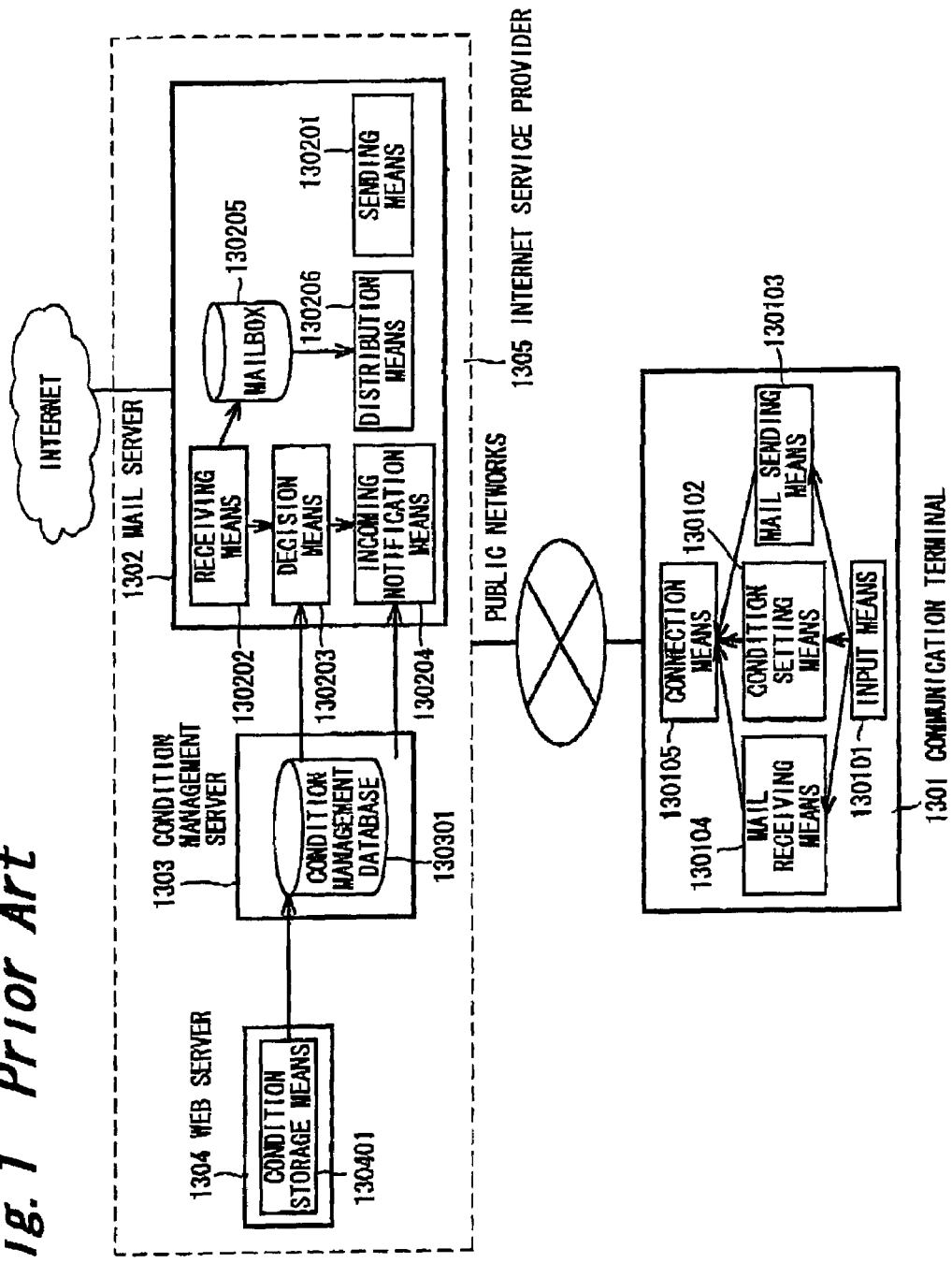
FIG. 1 is a block diagram showing the configuration of a mail incoming notification system according to a prior art.
Figure 2:
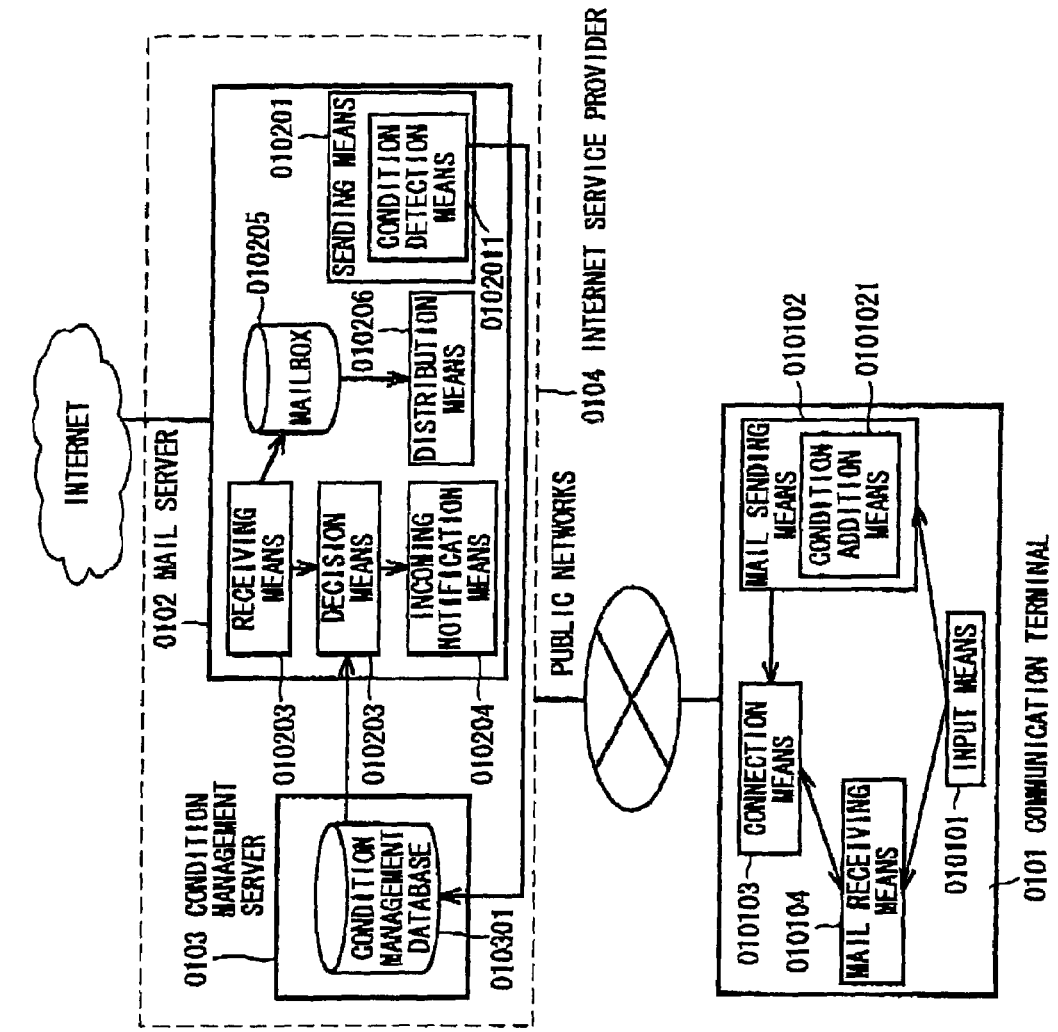
FIG. 2 is a block diagram showing the configuration of the mail incoming notification system according to a first embodiment of the present invention.

Embodiment 1 of the present invention is described below with reference to FIGS. 2 to 6. FIG. 2 is an example of a block diagram showing a mail incoming notification system. A reply to sending mail is described below as an incoming notification: condition and on the assumption that the Internet service provider and the user are under contract that enables mail sending and receiving via the Internet. In FIG. 2, 0101 indicates a portable terminal unit the user carries with him or her and on which a mail sending and receiving application is mounted or a communication terminal, such as a personal computer. Numeral 0102 indicates a mail server that distributes the mail received from the Internet to the communication terminal of a contract user via public networks and sends the electronic mail sent from the communication terminal of the contract user via public networks to the Internet. Numeral 0103 indicates a condition management server that manages an incoming notification condition. Numeral 0104 indicates an Internet service provider, for example, a provider who intermediates between public networks and the Internet and is constituted of the mail server 0102 and the condition management server 0103 connected via a network, such as a LAN.

In the communication terminal 0101, 010101 indicates an input means to which data is input via a mouse and a keyboard and 0101021 indicates a condition addition means to which an incoming notification condition is added when mail is sent. Numeral 010102 indicates a mail sending means that sends the mail to which the incoming notification condition was added by the condition addition means and 010104 indicates a mail receiving means that receives a mail incoming notification and receives mail data. Numeral 010103 indicates a connection means that establishes a communication path with the Internet service provider via public networks, performs data communication, and releases the communication path. In the mail server 0102, 0102011 indicates a condition detection means that detects the incoming notification condition that the condition addition means 0101021 assigned and 010201 indicates a sending means that assigns a message ID to the mail that the communication terminal 0101 sent and actually sends it to the Internet. Numeral 010202 indicates a receiving means that stores the mail sent from the Internet to the user mailbox of each destination and 010203 indicates a decision means that acquires an incoming notification condition from a condition management database 010301 and decides whether the mail that the receiving means 010202 received matches the condition. Numeral 010204 indicates an incoming notification means that sends an incoming notification to the termination terminal 0101 of the destination user when the result of the decision means 010203 matches and 010205 is a mailbox that stores and manages the mail that the receiving means 010202 received every destination user. Numeral 020206 indicates a distribution means that distributes receiving mail when the distribution of the receiving mail is requested from the communication terminal.

In the condition management server 0103, 010301 is a condition management database in which the incoming notification condition and information on the user who concluded a contact with an Internet service provider, for example, telephone numbers are held and managed. FIG. 3 shows a mail header example at mail sending and receiving and conforms to RFC822 (Requests for Comments) of IETF (Internet Engineering Task Force). In the RFC822, the mail for the header part and the body part, message partitioning, and the sequence and syntax of a header line are defined. Numeral 0201 indicates a mail header when the communication terminal 0101 sends mail and 0202 is a mail header when the mail is sent from the mail server 0102 to the Internet. Numeral 0203 indicates the header of the mail that the mail server 0102 received from the Internet.

FIG. 4 shows the user information management table that the condition management database 010301 holds. In FIG. 4, 0301 indicates a mail address of the user who concludes a contract with an Internet service provider and 0302 indicates a telephone number in the public networks of the same user as the mail address 0301. Numerals 0303 to 0306 indicate incoming notification conditions. Numeral 0303 indicates a mail sending date and time and 0304 indicates a mail title. Numeral 0305 indicates a destination mail address and 0306 indicates a mail message ID.

Figure 5:
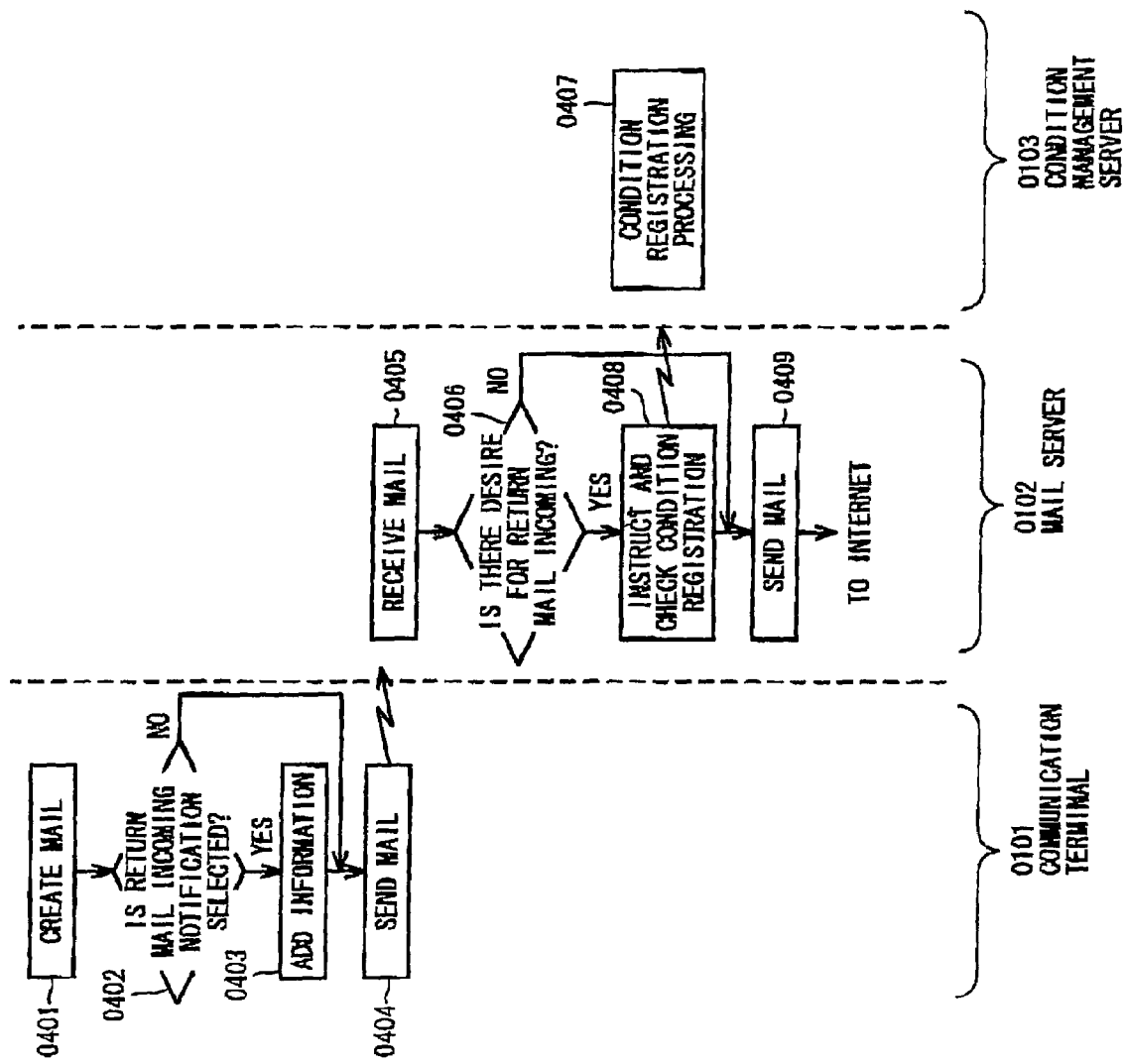
FIG. 5 is a flowchart for describing a mail sending processing procedure in the first, second, and fourth embodiments of the present invention.

FIG. 5 is a flowchart for describing an example of a processing procedure when a reply to sending mail is registered as the incoming notification condition from the communication terminal 0101 in a mail incoming notification system.

Subsequently, the processing procedure when the incoming notification condition is registered is described with reference to FIGS. 2 to 5. First, the processing procedure until mail is created from the communication terminal 0101 and whether an incoming notification is made for reply mail is set, then the mail is sent is described. The user uses the input means 010101 of the communication terminal 0101 to create the sending mail and select whether the incoming notification is allowed to be made when the Internet service provider received the reply, then input a mail sending request (step 0401). In the communication terminal 0101, when the mail sending request is input from the input means 010101, the mail sending means 010102 decides whether the incoming notification is selected for the reply mail (step 0402). When the incoming notification is selected, the information in which the reply mail is used as the incoming notification condition is added by the condition addition means 0101021 (step 0403). When the incoming notification is not selected, dial-up connection is made by the connection means 010103 to the Internet service provider via public networks without adding any condition and the mail is sent, then the connection is released after the sending is terminated (step 0404). The header of the sending mail when the condition addition means 0101021 sets the reply to the sending mail as the incoming notification condition is assigned as "X-Reply-Push: ON" in the step 0201 and the header of the sending mail when the means does not set it is assigned as "X-Reply-Push: OFF" in the step 0201, in accordance with the RFC822.

Subsequently, the processing procedure until the Internet service provider 0104 receives the mail sent from the communication terminal 0101 and sends the mail to the Internet is described. The Internet service provider 0104 receives the mail the communication terminal 0101 sent by the sending means 010201 of the mail server 0102 (step 0405), and decides by the mail header 0201 whether there is a desire for sending the incoming notification when a message ID is assigned to the mail header and the reply to the mail is received using the condition detection means 0102011 (step 0406). If the mail header is "X-Reply-Push: ON", an instruction is given to the condition management server 0103 so that the mail header information can be registered in the corresponding user table "foo@test. or. jp" of the condition management database 010301 (step 0408).

This instruction allows the condition management server 0103 to register "2000/3/24 05: 33: 45" in the sending date and time 0303, "mail subject" in the title 0304, "bar@xxx. co. jp" in the destination address 0305, and the message ID "200003232033, FAA14305@test. or. jp" assigned by the sending means 010201 in the message ID 0306 (step 0407). When the mail server 0102 checks that the mail header information was registered in the condition management server 0103 by the condition detection means 0102011 (step 0408), the mail is sent to the Internet by the sending means 010201 (step 0409). If the header is "X-Reply-Push: OFF", the mail is sent to the Internet by the sending means 010201 with no registration. When the mail is sent to the Internet, the mail header 0201, as shown in the step 0202, allows "X-Reply-Push: ON/OFF" to be deleted and the message ID "200003232033, FAA14305@test. or. jp" to be assigned and sent. In the steps 401 to 408, the user is assumed to have been able to register the reply to the sending mail in the Internet service provider 0104 as the incoming notification condition using the communication terminal 0101.

Figure 6:
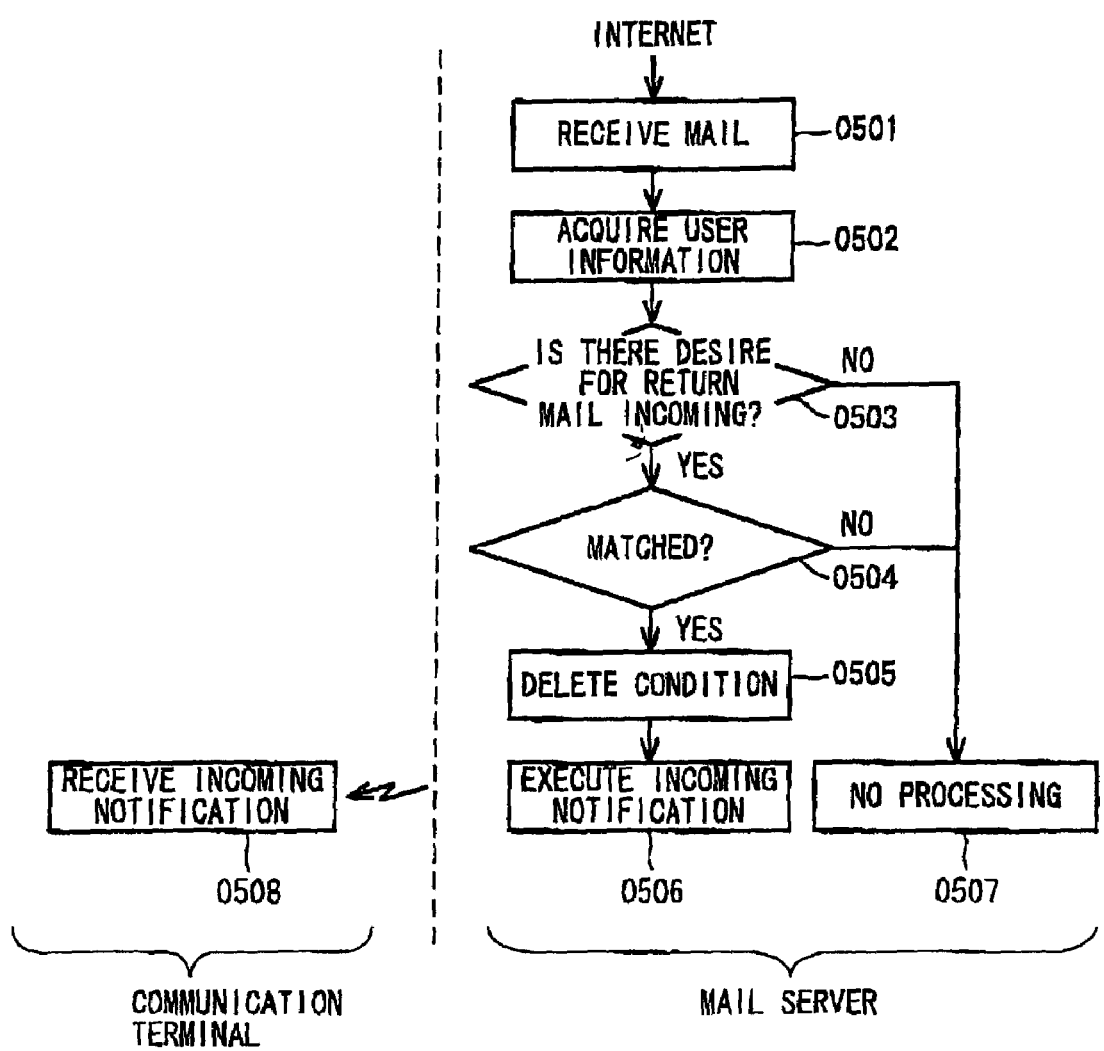
FIG. 6 is a flowchart for describing a processing procedure from reception of mail to issuing of incoming notification according to the first, second, third, and fourth embodiments of the present invention.

FIG. 6 is a flowchart for describing an example of the processing procedure when the Internet service provider 0104 receives a reply to sending mail and makes an incoming notification to the communication terminal 0101. The processing procedure until the Internet service provider 0104 receives the reply to the sending mail and makes the incoming notification to the communication terminal 0101 with reference to FIGS. 2 to 4 and FIG. 6. The Internet service provider 0104 receives the mail from the Internet using the receiving means 010202 and stores it in the mailbox 010205 (step 0501) and extracts the destination user "foo@test. or. jp" from the received mail header 0203. Further, the user information of the destination user is acquired from the condition management database 010301 using the decision means 010203 (step 0502) and checks the user information according to whether the user sets the incoming notification condition at mail sending or whether the condition is registered (step 0503). If the condition is not registered, the processing terminates (step 0507), and, when the condition was registered, whether the return mail matches the condition, that is, whether the references of the mail header 0203 or the message ID of In-Reply-To and the message ID acquired from the condition management database 010301 are equal is checked (step 0504). When it is decided that they are equal by the decision means 010301, the corresponding incoming notification condition is deleted from the condition management database 010301 (step 0505) and the incoming notification to the communication terminal 0101 is made by making a telephone call using a telephone number acquired from the condition management database 010301 (step 0506).

When it is decided that they are unequal, no incoming notification is made (step 0507). The communication terminal 0101 receives the incoming notification from the Internet service provider 0104 by the connection means 010103 (step 0508). In the steps 0501 to 0508, the user can know from the incoming notification that the reply to the sent mail arrived at an Internet service provider. What existing methods can also be used for the incoming notification of the communication terminal 0101 from this Internet service provider 0104 and the acquisition of the mail that provides an opportunity for the incoming notification. For example, according to a sending number notification service, the number of the Internet service provider is posted to the user when a contract is concluded and the communication terminal 0101 recognizes by ringing or no-ringing that a telephone call was made. Subsequently, the telephone call can also be disconnected manually by visually checking that the telephone call is the number of the Internet service provider or the telephone call can also be disconnected automatically by allowing the user to incorporate manual operation in the communication terminal 0101. Further, dial-up connection is made using the connection means 010103 after disconnection and the corresponding mail can also be acquired manually using the mail receiving means 010104 and the distribution means 010206. Further, the communication terminal 0101 maintains the connection through which the incoming notification is posted by the connection means 010103 as is and can also acquire the corresponding mail using the mail receiving means 010104 and the distribution means 010206 automatically.

The present invention is not limited to the above-mentioned embodiment and can make various modifications within the scope of the claims. For example, in the above-mentioned description, it is described that the mail server 0102 and the condition management server 0103 are individual units. A part or the entirety can also be integrated, however, and can also be arranged in a distributed displacement. Although the mail server 0102 assigns a message ID, it can also be assigned uniquely at the communication terminal side. Further, although this embodiment uses the reply to the sending mail as the incoming notification condition, another condition that is related closely to the sending mail can also be used as the incoming notification condition.

Embodiment 2

Embodiment 2 adds an incoming notification condition deletion mechanism to embodiment 1 and performs processing operation in almost the same manner as embodiment 1 except the processing related to it. This embodiment is described below on the same assumption as embodiment 1.

Figure 7:
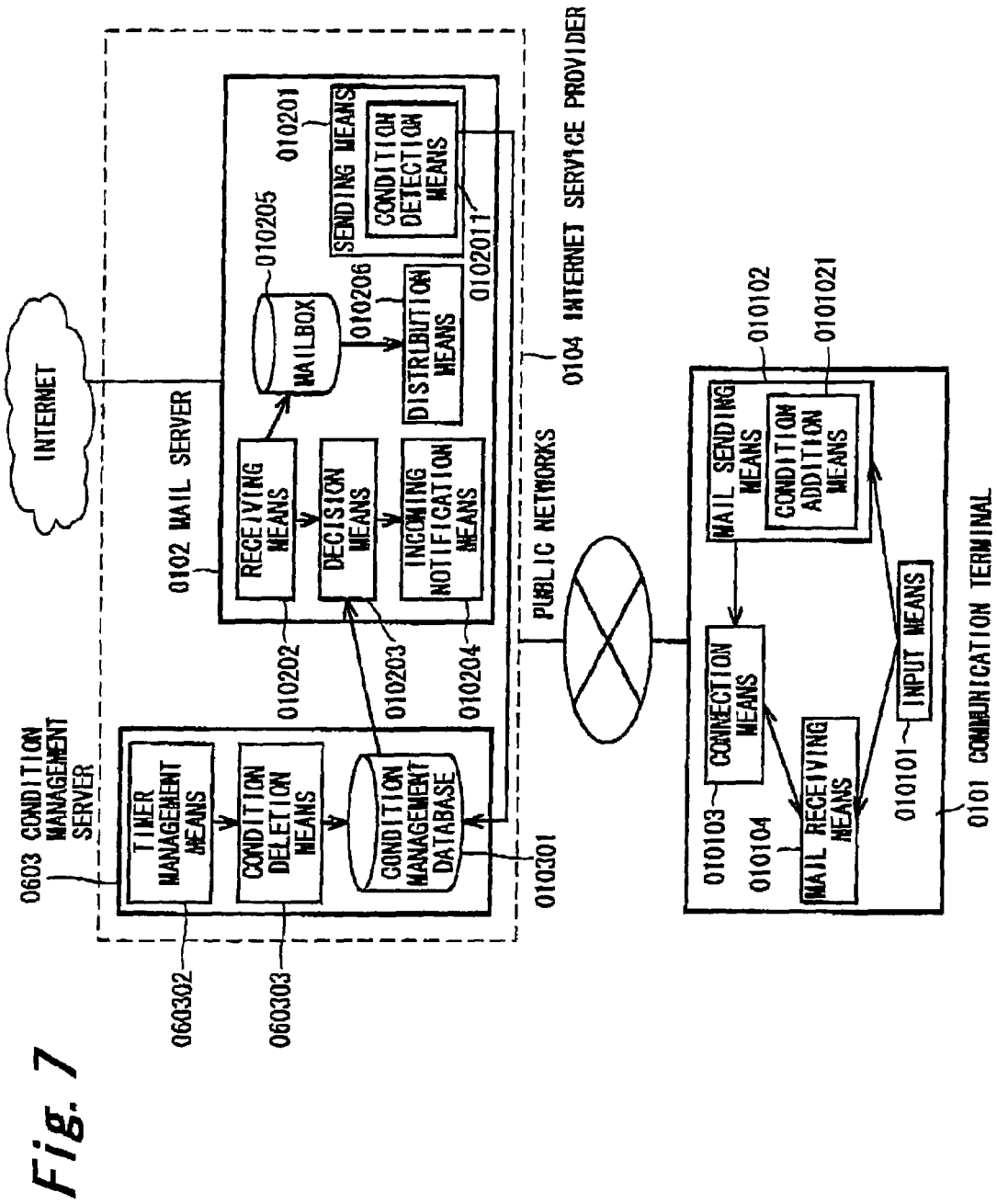
FIG. 7 is a block diagram showing the configuration of the mail incoming notification system according to the second embodiment of the present invention.

FIG. 7 is an example of the block diagram of the mail incoming notification system. In FIG. 7, almost the same items of embodiment 1 are shown except a condition management server 0603. In the condition management server 0603, a condition management database is equal to that of embodiment 1. Numeral 060302 is a timer management means that monitors whether a fixed time, for example, one week elapsed from the mail sending time in the incoming notification condition managed in a condition management database 060301 and 060303 is a condition deletion means that changes the incoming notification condition under which it was decided that a fixed time elapsed in the timer management means 060302.

A mail header and a table are equal to those of embodiment 1 shown in FIGS. 3 and 4 respectively.

The processing procedure until a reply to sending mail is registered from the communication terminal 0101 in the Internet service provider 0104 as the incoming notification condition is the same as FIG. 5 of embodiment 1. The processing procedure in which it is posted to the communication terminal 0101 as the incoming notification that the Internet service provider 0104 received the mail that matches the incoming notification condition that the user registered is the same as FIG. 6 of embodiment 1.

In embodiment 2, the processing in which the reply to the sending mail that the user registered from the communication terminal 0101 as the incoming notification condition was not received even if a fixed time elapsed in the Internet service provider 0104 is described below with reference to FIG. 7. First, the timer management means 060302 compares the sending date and time 0303 of the table shown in FIG. 4 that the condition management database 010301 holds once a day and the current date and time periodically, for example, once a day, and monitors whether there is the incoming notification condition under which a fixed time, for example, one week, elapses. That is, that the incoming notification condition under which the fixed time elapses shows that the mail server 0102 does not receive the reply to the sending mail.

If there was an incoming notification condition under which the fixed time elapses, the timer management means 060302 deletes the detected incoming notification condition using the condition deletion means 060303. Accordingly, in embodiment 1, although the condition until the mail that matches the incoming notification condition is received was kept being held, in this embodiment, the incoming notification condition of the mail that could not be received even if a fixed time elapses is deleted automatically.

The present invention is not limited to the above-mentioned embodiment and can make various modifications within the scope of the claims. For example, in the above-mentioned description, it is described that the mail server 0102 and the condition management server 0603 are individual units. A part or the entirety can also be integrated, however, and can also be arranged in a distributed displacement. Although the mail server 0102 assigns a message ID, it can also be assigned uniquely at the communication terminal side.

Embodiment 3

Embodiment 3, in Embodiment 1, adds a processing mechanism that allows one user to manage the number of incoming notification conditions that can be registered in a condition management database and prevents the maximum number of registered conditions from being exceeded, and performs processing operation in almost the same manner as embodiment 1 except the processing that is related to it. This embodiment is described below with a reply to sending mail as an example in the same manner as embodiment 1.

Figure 8:
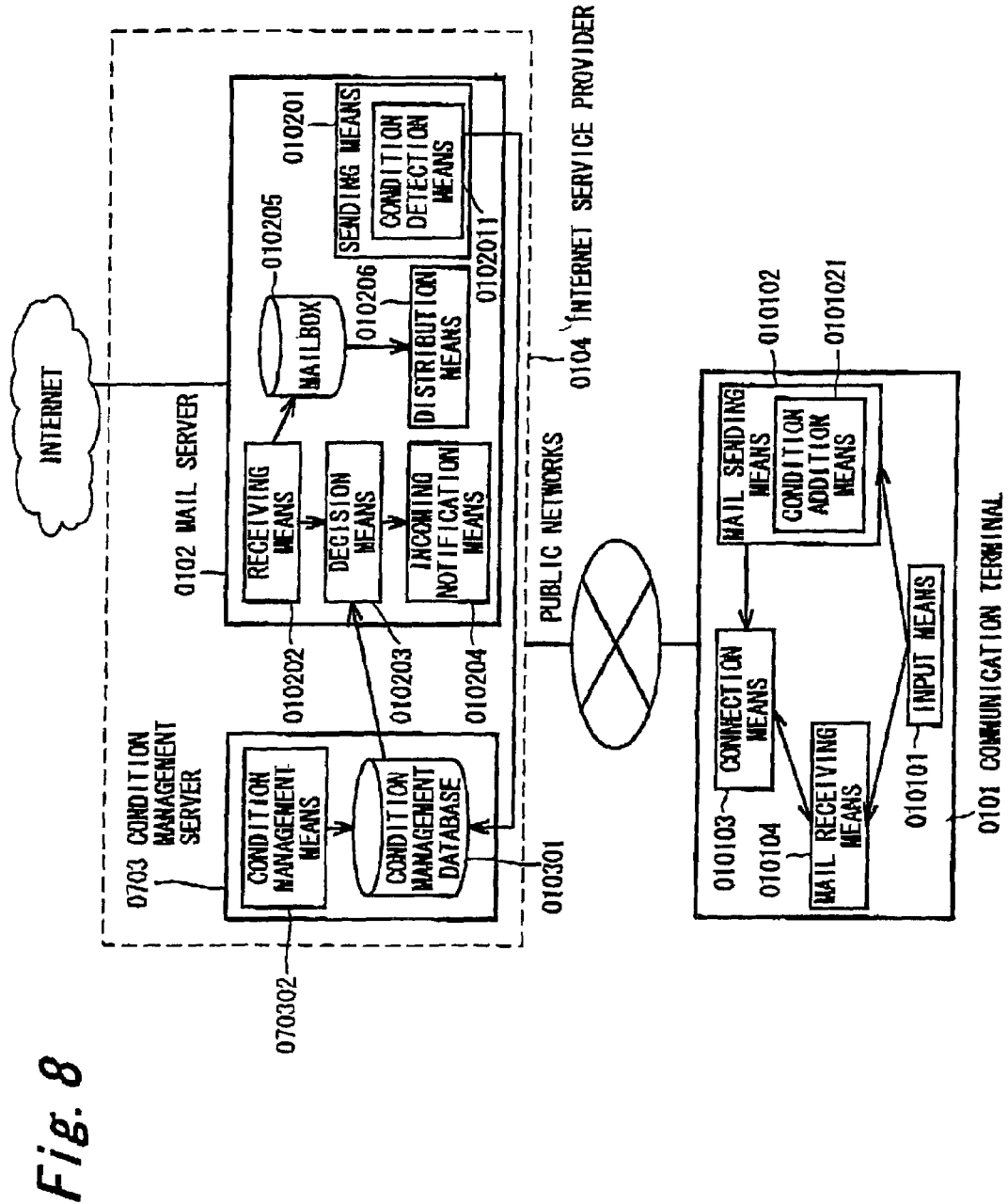
FIG. 8 is a block diagram showing the configuration of the mail incoming notification system according to the third embodiment of the present invention.

FIG. 8 is an example of the block diagram of the mail incoming notification system. In FIG. 8, almost the same items as embodiment 1 are shown except a condition management server 703. In the condition management server 0703, a condition management database is equal to that of embodiment 1. Numeral 070302 is a condition management means that manages the number of incoming notification conditions that one user can register in the condition management database 010301 and performs the processing that prevents the maximum number of registered conditions from being exceeded, for example, overwriting the incoming notification condition that exceeds the maximum number of registered conditions to the oldest sending date and time.

A mail header and a table are equal to those of embodiment 1 shown in FIGS. 3 and 4 respectively.

Figure 9:
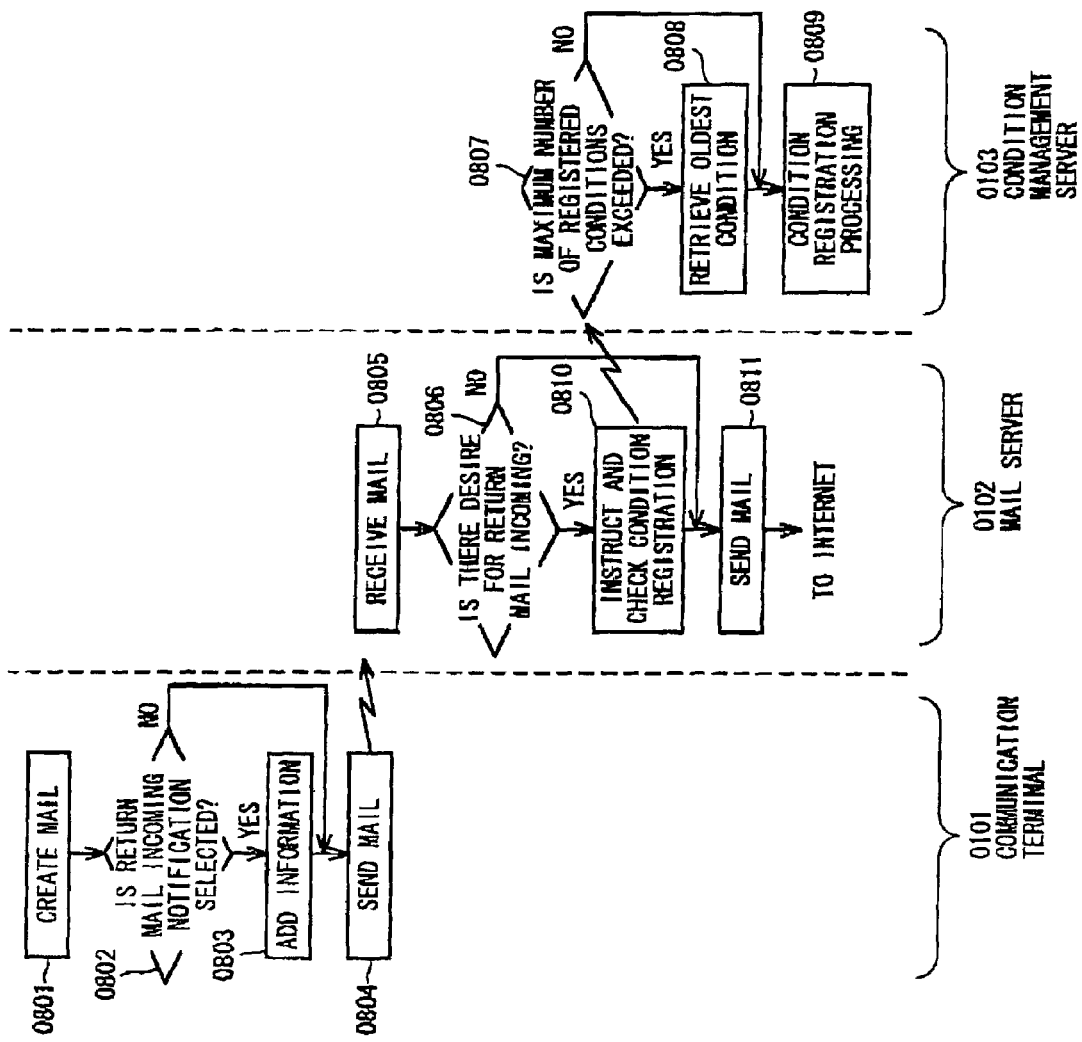
FIG. 9 is a flowchart for describing the mail sending processing procedure according to the third embodiment of the present invention.

In embodiment 1, the processing procedure when the user registers the incoming notification condition in the provider 0104 using the communication terminal 0101 is described below with reference to FIGS. 8 and 9. FIG. 9 is a flowchart for describing the registration processing procedure of the incoming notification condition at mail sending in the third embodiment of the present invention.

In this flowchart, the processing procedures in steps 0801 to 0804 are equal to those in the steps 0401 to 0404 of FIG. 5 of embodiment 1. The Internet service provider 0104 receives the mail sent from the communication terminal 0101 by the sending means 010201 (step 0805). The Internet service provider assigns a message ID to a mail header, and decides by the mail header 0201 whether there is a desire for sending the incoming notification to the communication terminal 0101 when the reply to the mail was received using the condition detection means 0102011 (step 0806). Further, if the mail header is "X-Reply-Push: ON", an instruction is given to the condition management server 0103 so that the mail header information can be registered in the corresponding user table "foo@test. or. jp" of the condition management database 010301 as the incoming notification condition (step 0810). When the condition management server 0103 receives the instruction, the condition management means 070302 checks whether the registered number of conditions exceeds the maximum number of registered conditions when the mail header information is registered in the condition management database 010302 (step 0807). Further, if the maximum number of registered conditions is exceeded, the incoming notification condition that is the oldest sending date and time is detected (step 0808) and registered by overwriting the instructed information to the condition table detected in the step 0808 (step 0809). Further, if the number of registered conditions is below the maximum number of registered conditions, the instructed information is registered as is (step 0809).

According to the registration in the step 0809, "2000/3/24 05; 33; 45" for the sending date and time 0303, "mail subject" for the title 0304, "bar@xxx. co. jp" for the destination address 0305, and the message ID "200003232033. FAA14305@test. or. jp" assigned to the message ID 0306 by the sending means 010201 were registered in the condition management database 010301 by the condition management server 0103. When the mail server 0102 checks the registration of the condition management server 0103 (step 0810), the mail is sent to the Internet (step 0811). Further, if the mail header is "X-Replay-Push: OFF", the mail is sent to the Internet with no registration (step 0811). When the mail is sent to the Internet, the mail header 201, as shown in the step 0202, deletes "X-Reply-Push: ON/OFF" and assigns and sends the message ID "200003232033. FAA14305@test. or. jp". In the steps 0801 to 0811, the reply to the sending mail was registered from the communication terminal 0101 as the incoming notification condition. The processing procedure until it is posted to the communication terminal 0101 that the user has as the incoming notification that the Internet service provider 0104 received the mail that matches the incoming notification condition is the same as FIG. 6 of embodiment 1.

The present invention is not limited to the above-mentioned embodiment and can make various modifications within the scope of the claims. For example, in the above-mentioned description, it is described that the mail server 0102 and the condition management server 0703 are individual units. A part or the entirety can also be integrated, however, and can also be arranged in a distributed displacement. Although the mail server 0102 assigns a message ID, it can also be assigned uniquely at the communication terminal side. Further, in this embodiment, the incoming notification condition that exceeds the maximum number of registered conditions is registered by the condition management means 070302 of the condition management server 0703, and the oldest condition is deleted. However, that may be changed not to register the incoming notification condition that exceeds the maximum number of registered conditions.

Embodiment 4

Embodiment 4 adds a mechanism that refers to and changes the incoming notification condition registered at mail sending from the communication terminal 0101 in a different opportunity from the mail sending and receiving and performs processing operation in almost the same manner as embodiment 1 except the processing that is related to it. This embodiment is described below on the same assumption as embodiment 1.

Figure 10:
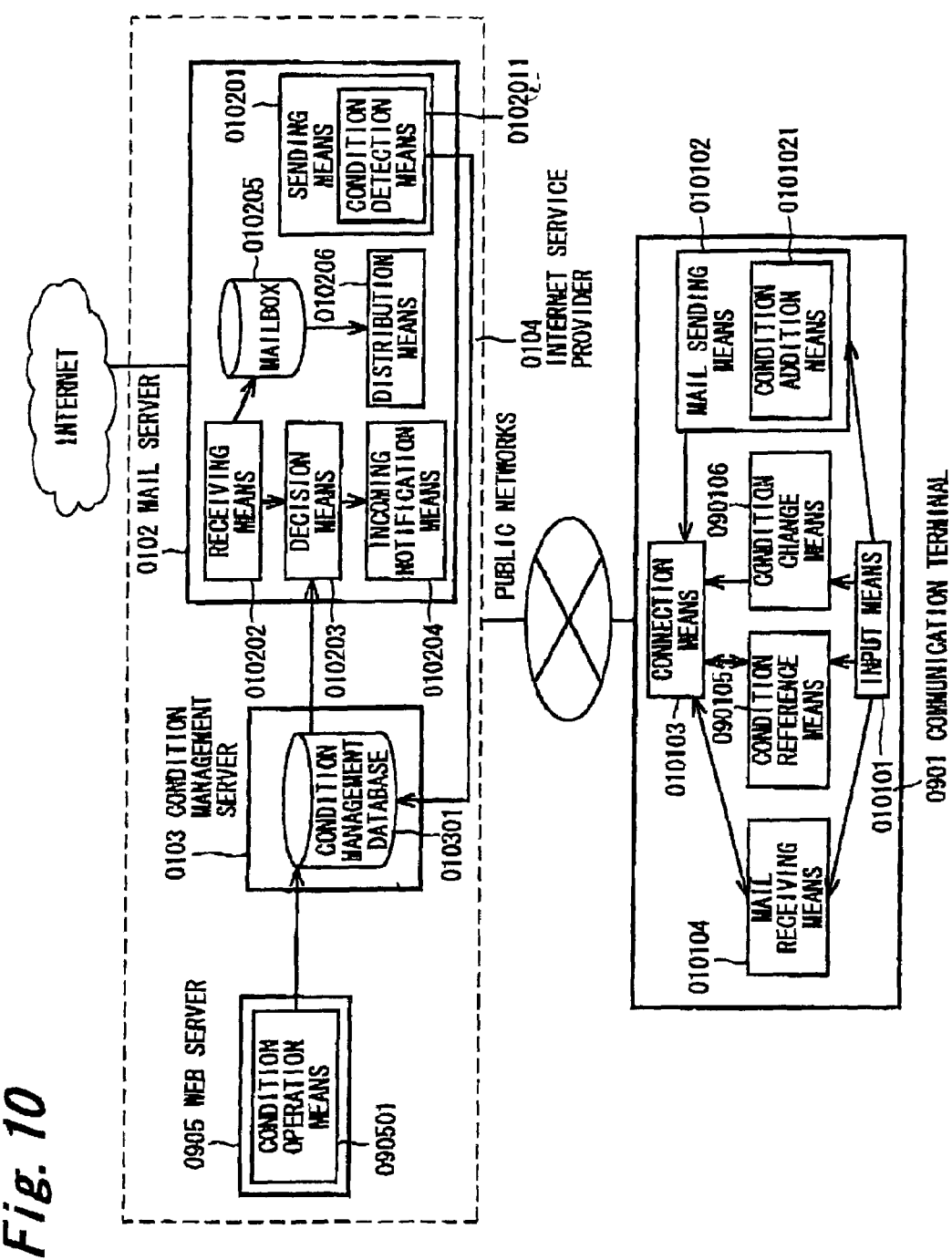
FIG. 10 is a block diagram showing the configuration of the mail incoming notification system according to the fourth embodiment of the present invention.

FIG. 10 is an example of the block diagram of the mail incoming notification system. In FIG. 10, almost the same items of embodiment 1 are shown except a communication terminal 0901 and a Web server 0905. In the communication terminal 0101, items other than 090105 and 090106 are the same as embodiment 1. Numeral 090105 is a condition reference means that refers to the incoming notification condition registered in the condition management database 010301 at mail sending when it is connected to the Internet service provider 0104 by the connection means 010103 and 090106 is a condition change means that changes the incoming notification condition registered in the condition management database 010301 at mail sending.

For example, the condition reference means 090105 is browser software and displays a setting change screen for the incoming notification condition by reading a format, such as HTML (Hyper Text Makeup Language). The user inputs a setting change from the screen using the input means 010101 and can perform the setting change of the incoming notification condition by the condition change means 090106. In the Internet service provider 0104, 0905 is the Web server that manages a network, and 090501 is a condition operation means provided on the Web server as shown in FIG. 10, has the data described in the HTML format, and operates the condition management server 0103 in accordance with external input.

A mail header and a table are equal to those of embodiment 1 shown in FIGS. 3 and 4 respectively.

The processing procedure until the user registers the reply of the sending mail is registered in the Internet service provider 0104 via the communication terminal 0901 as the incoming notification is the same as FIG. 5 of embodiment 1. Further, when the Internet service provider 0104 received the mail that matches the incoming notification condition, the processing procedure in which the mail is posted to the communication terminal 0901 as the incoming notification is the same as FIG. 6 of embodiment 1.

Figure 11:
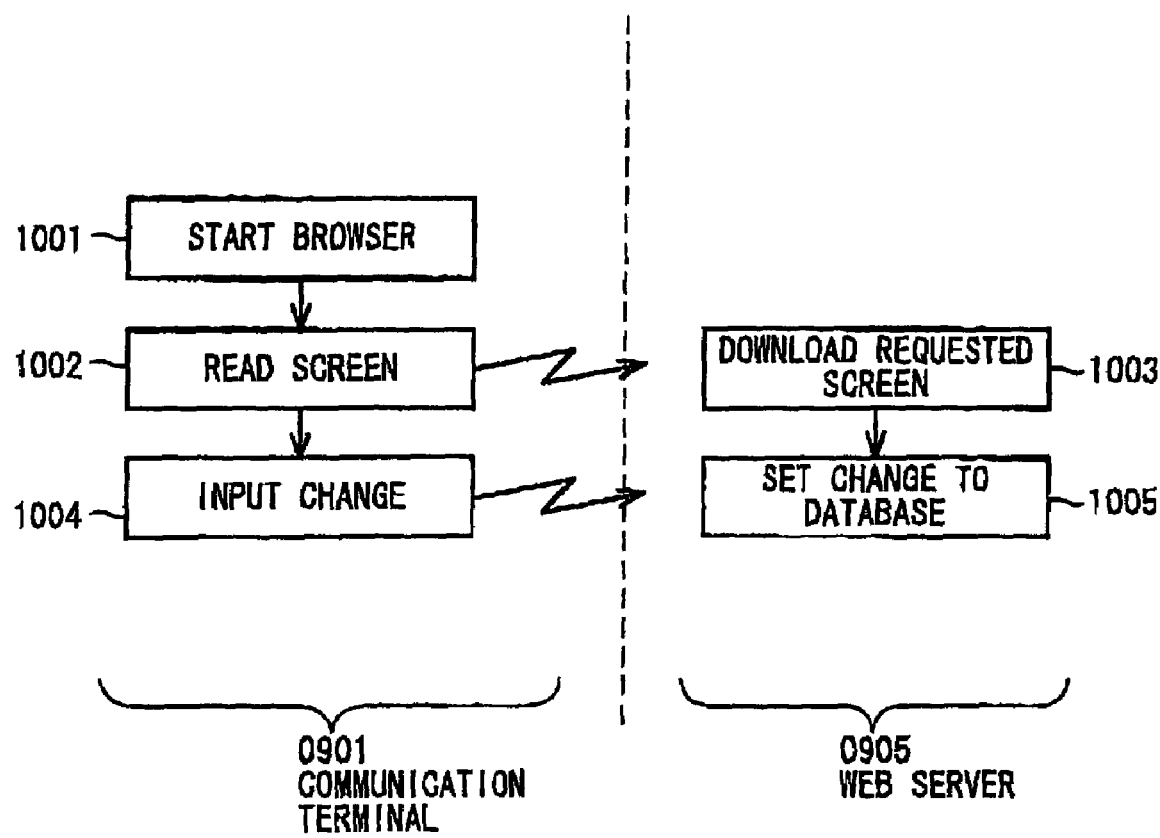
FIG. 11 is a flowchart for describing the processing procedure for the setting change of an incoming notification condition according to the fourth embodiment of the present invention.

FIG. 11 is an example of the processing procedure when the incoming notification condition is changed. In embodiment 4, the processing procedure in which the incoming notification condition registered in the provider 0104 is referred to and changed using the communication terminal 0901 is described with reference to FIGS. 10 and 11. First, the user starts browser software by the input means 010101 and inputs a calling request for a listing/change screen of the incoming notification condition registered in the Internet service provider 0104. The communication terminal 0901 starts the browser software (step 1001), connects with the Internet service provider 0104 using the connection means 010103, and reads the listing/change screen described in the HTML format from the Web server 0905 by the condition reference means 090105 (steps 1002 and 1003). The listing/change screen displays the information shown in FIG. 4.

Next, when the user inputs a setting change on the listing/change screen of the incoming notification condition displayed on the browser software (step 1004), the information is sent from the condition change means 090106 to the Web server 0905 and the corresponding incoming notification information on the condition management database 010301 is updated by the condition operation means 090501 (step 1005). Accordingly, in embodiment 4, the condition until the mail that matches the incoming notification condition was kept being held. In this embodiment, however, the incoming notification condition can be referred to and changed from the communication terminal 0901 in a different opportunity from the mail sending and receiving. Besides, the deletion of the incoming notification condition is also included in the change of the incoming notification condition.

The present invention is not limited to the above-mentioned embodiment and can make various modifications within the scope of the claims. For example, in the above-mentioned description, it is described that the mail server 0102, the condition management server 0103, and the Web server 0905 are individual units. A part or the entirety can also be integrated, however, and can also be arranged in a distributed displacement. Although the mail server 0102 assigns a message ID, it can also be assigned uniquely at the communication terminal side.

Embodiment 5

Embodiment 5 adds a mechanism to embodiment 1 that creates the contents that an Internet service provider ought to post to the user, for example, information of high urgency, such as a system fault and maintenance, as the mail and spontaneously issues the incoming notification to the user as if the mail were received via the Internet, thereby performing processing operation in almost the same manner as embodiment 1 except the processing that is related to it. This embodiment is described below taking the case where the Internet service provider posts to the corresponding user that the embodiment is on the same assumption as embodiment 1 and the capacity of the user mailbox exceeds a certain threshold and a capacity overflow may occur.

Figure 12:
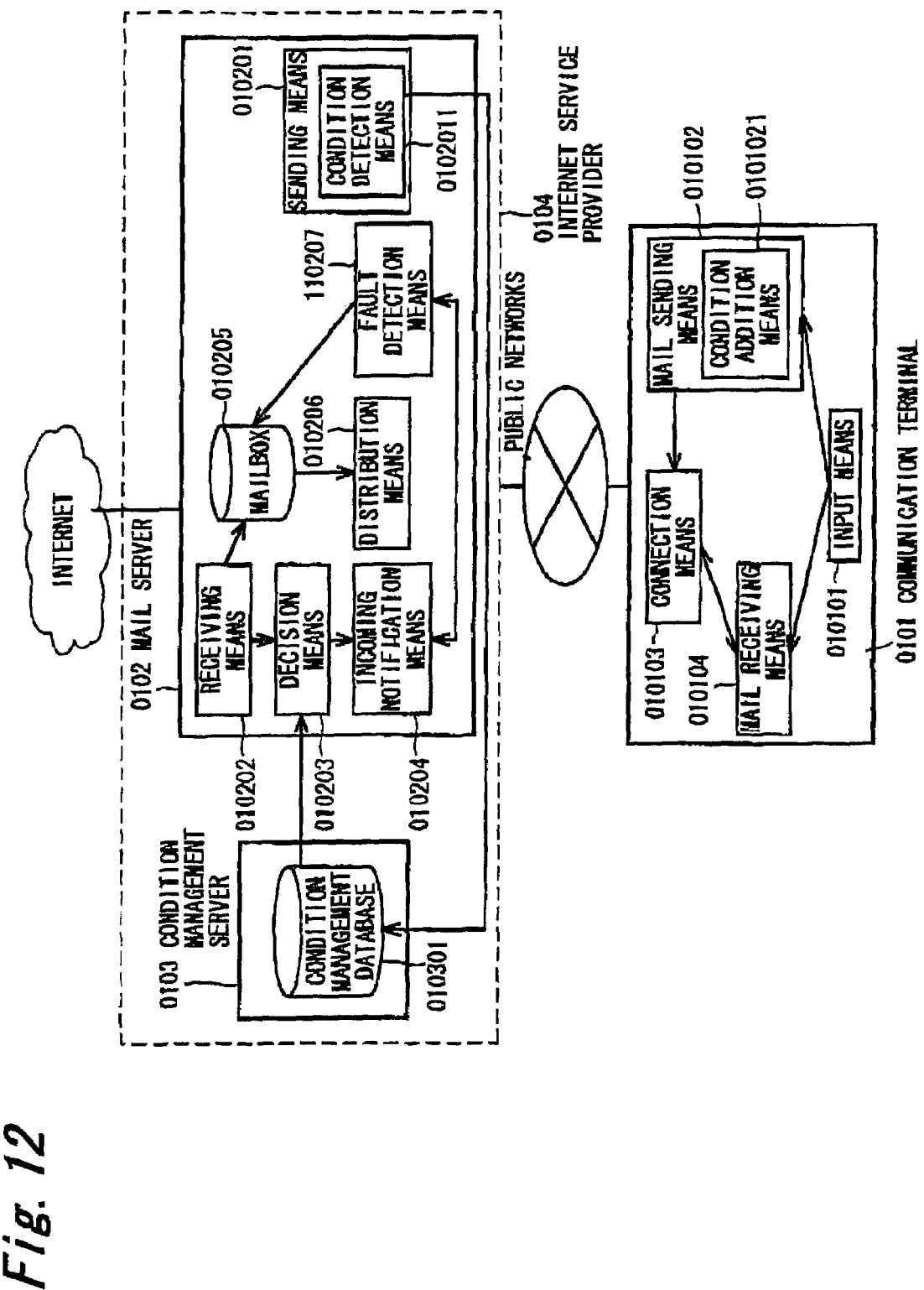
FIG. 12 is a block diagram showing the configuration of the mail incoming notification system according to a fifth embodiment of the present invention.

FIG. 12 is an example of the block diagram of the mail incoming notification system. In FIG. 12, 1102 is a mail server that cannot delete the mail only by acquiring the mail from the mailbox, for example, a server of the IMAP (Internet Message Access Protocol) version 4 defined in an RFC 2060. To delete the mail, the user must consciously delete the mail from the mailbox of the Internet service provider 0104. The mail sever 1102 has almost the same items as embodiment 1 except 110207. 110207 is the fault detection means that checks the capacity of the mailbox 010205 of each contract user every fixed intervals, for example, once a day, and, if the capacity exceeds a threshold, for example, 80% of the mailbox capacity at contract, creates the mail indicating the result and stores it in the mailbox, thereby making the incoming notification to the user.

A mail header and a table are equal to those of embodiment 1 shown in FIGS. 3 and 4 respectively.

Figure 13:
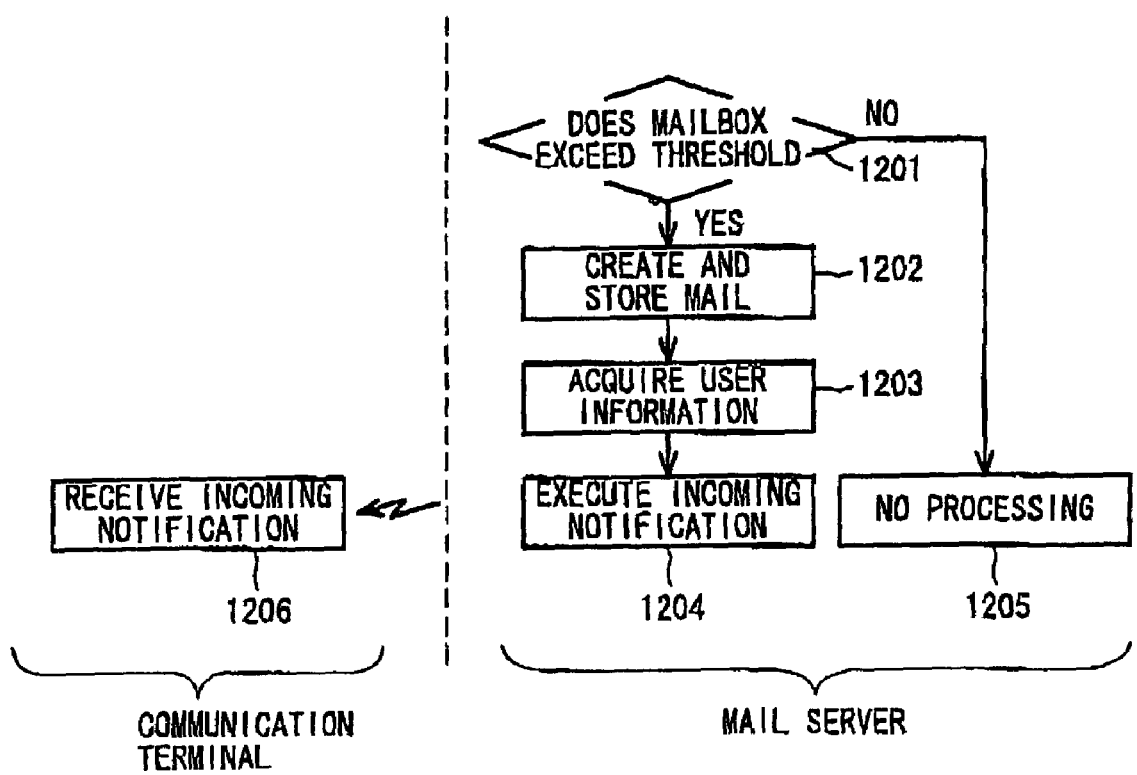
FIG. 13 is a flowchart for describing an incoming notification processing procedure according to the fifth embodiment of the present invention.

The processing procedure in which the user registers a reply to sending mail in the Internet service provider 0104 via the communication terminal 0101 as the incoming notification condition is the same as FIG. 5 of embodiment 1. The processing procedure until it is posted to the communication terminal 0101 that the user has as the incoming notification that the Internet service provider 0104 received the mail that matches the incoming notification condition is the same as FIG. 6 of embodiment 1. The processing procedure in which, in embodiment 5, the Internet service provider 0104 detects that the capacity of the user mailbox exceeds a threshold and a capacity overflow may be apt to occur for a slighter moment and is posted to the communication terminal 0101 as the incoming notification is described with reference of FIGS. 12 and 13. FIG. 13 is a flowchart for describing the incoming notification processing procedure according to the fifth embodiment of the present invention.

In this processing procedure, first, the fault detection means 110207 checks once a day whether the mailbox activity ratios of all contract users occupy 80% of the capacity (step 1201). As a result of the check, if the mailbox activity ratios are below 80%, no processing is performed (step 1205). When the mailbox activity ratios exceed 80%, the mail posting that a mailbox capacity overflow may occur is created and stored in the mailbox (step 1202). The telephone number 0302 in public networks of the corresponding user is acquired from the condition management database 0103 (step 1203) and the incoming notification is issued to the telephone number (step 1204). The communication terminal 0101 receives the incoming notification using the connection means 0103 and the mail receiving means 010104 (step 1206).

When the user receives the incoming notification to the communication terminal 0101, the user connects with the Internet service provider 0104 using the dial-up method and acquires his or her own mail. Further, the user checks the mail from the Internet service provider 0104 indicating that the capacity of the mailbox overflows for a slighter moment in the meantime and deletes the mail of the mailbox appropriately. Accordingly, the user can previously prevent the capacity of the mailbox from overflowing.

Any of existing methods may be used for the incoming notification of the communication terminal 0101 from this provider 0104 and the acquisition of the mail that provides an opportunity for the incoming notification. For example, according to a sending number notification service, the number of the Internet service provider is posted to the user when a contract is concluded and the communication terminal 0101 recognizes by ringing or no-ringing that a telephone call was made. Subsequently, the telephone call can also be disconnected manually by visually checking that the call is of the Internet service provider or the telephone call can also be disconnected automatically by allowing the user to incorporate manual operation in the communication terminal 0101. Further, dial-up connection is made using the connection means 010103 after disconnection and the corresponding mail can also be acquired manually using the mail receiving means 010104 and the distribution means 010206. Further, the communication terminal 0101 maintains the connection through which the incoming notification is posted by the connection means 010103 as is and can also acquire the corresponding mail using the mail receiving means 010104 and the distribution means 010206 automatically. Accordingly, the contents that the Internet service provider 0104 ought to post to the user, for example, the system fault detection and maintenance information can be posted to the corresponding user by creating the mail that posts the effect and issuing the incoming notification.

The present invention is not limited to the above-mentioned embodiment and can make various modifications within the scope of the claims. For example, in the above-mentioned description, it is described that the mail server 0102 and the condition management server 0103 are individual units. A part or the entirety can also be integrated, however, and can also be arranged in a distributed displacement. Although the mail server 0102 assigns a message ID, it can also be assigned uniquely at the communication terminal side. Further, in this embodiment, the fault detection and maintenance information that an Internet service provider ought to post to the user are posted according to the incoming notification and the mail. On the contrary, the existing method of posting the information only by the incoming notification without using the mail, such as this is realized by adding the contents to be posted to the user-to-user information and performing the incoming notification using the ISDN as public networks, can also be used.

The present invention was described based on the desirable embodiment shown in the drawings. It is evident, however, that a person skilled in the art can easily perform various changes and alterations without deviating from the idea of the present invention. The present invention includes such modification examples.

What is claimed is:

1. A server unit that sends and receives, stores, and manages electronic mail, comprising:

a condition management database that stores and manages an incoming notification condition set on a sending electronic mail by a communication terminal and used for deciding whether an incoming notification is made or not made when said server unit receives a responsive electronic mail for responding to a said sending electronic mail and having a message ID for identifying said sending electronic mail;

a condition detection means that detects said incoming notification condition from the electronic mail sent from the communication terminal and stores said incoming notification condition in said condition management database;

a sending means for sending an electronic mail received from said communication terminal to which a message ID have been given by said communication terminal or said server unit to another unit or terminal;

a decision means that acquires the incoming notification condition from said condition management database and checks whether the incoming notification is to be made to the communication terminal when the responsive electronic mail for responding to said sending electronic mail was received from an other terminal or device through a network;

an incoming notification means that deletes said incoming notification condition from said condition management database and makes the incoming notification for an address of the communication terminal when the incoming notification is made as a result of said checks of said decision means; and a distribution means that distributes the receiving electronic mail when the distribution of receiving electronic mail was requested from the communication terminal.

2. An incoming notification system constituted of a server unit, comprising:

a communication terminal including, a condition addition means that sets, on a sending electronic mail, an incoming notification condition used for deciding whether an incoming notification is made or not made when a responsive electronic mail, for responding to said sending electronic mail and having a message ID for identifying said sending electronic mail, is received;

a sending means for sending said sending electronic mail to which said incoming notification condition is added to an other terminal; and a server unit having a an electronic mail sending and receiving function, including,
a condition management database that stores and manages the incoming notification condition used for deciding whether an incoming notification is made or not made when said server unit receives the electronic mail having the message ID for identifying said sending electronic mail,
a condition detection means that detects said incoming notification condition from the electronic mail sent from a communication terminal and stores said incoming notification condition in said condition management database
a sending means for sending a an electronic mail received from said communication terminal to which a message ID have been given by said communication terminal or said server unit to an other unit or terminal;
a decision means that acquires the incoming notification condition from said condition management database and checks whether the incoming notification is to be made to the communication terminal when a responsive electronic mail for responding to said sending electronic mail was received from the other terminal or device through a network,
incoming notification means that deletes said incoming notification condition from said condition management database and makes the incoming notification for the address of the communication terminal when the incoming notification is made as a result of said checks of said decision means, and
a distribution means that distributes the receiving electronic mail when the distribution of the receiving electronic mail was requested from the communication terminal.

3. The server unit according to claim 1, further comprising:
a timer management means that, after the incoming notification condition is registered in the condition management database, monitors time from the registration of the condition; and
a deletion means that, when a fixed time elapses in the incoming notification condition, deletes the condition.

4. The electronic mail incoming notification system according to claim 3, wherein the server unit comprises the timer management means that, after the incoming notification condition is registered in the condition management database, monitors the time from the registration of the condition and the deletion means that, when the fixed time elapses in the incoming notification condition, deletes the condition.

5. The server unit according to claim 1, further comprising a condition management means that manages the incoming notification condition so that the maximum number of registered conditions cannot be exceeded when the incoming notification condition is newly registered in the condition management database and performs processing that prevents it when said maximum number of registered conditions is exceeded.

6. The electronic mail incoming notification system according to claim 3, wherein the server unit manages the incoming notification condition so that the maximum number of registered conditions cannot be exceeded when the incoming notification condition is newly registered in the condition management database and performs the processing that prevents it when said maximum number of registered conditions is exceeded.

7. The server unit according to claim 1, further comprising a condition operation means that operates the incoming notification condition stored in the condition management database according to a request from the communication terminal.

8. An electronic mail incoming notification system, comprising: a communication terminal including, a condition addition means that sets, on a sending electronic mail, an incoming notification condition used for deciding whether an incoming notification is made or not made when a responsive electronic mail, for responding to said sending electronic mail and having a message ID for identifying said sending electronic mail, is received;
a sending means for sending said sending electronic mail to which said incoming notification condition is added to an other terminal; and
a server unit having a an electronic mail sending and receiving function, including,
a condition management database that stores and manages an incoming notification condition used for deciding whether an incoming notification is made or not made when said server unit receives a responsive electronic mail for responding to a sending electronic mail having a message ID for identifying said sending electronic mail,
a condition detection means that detects said incoming notification condition from the electronic mail sent from a communication terminal and stores it in said condition management database;
a sending means for sending a an electronic mail received from said communication terminal to which a message ID have been given by said communication terminal or said server unit to another unit or terminal;
a decision means that acquires the incoming notification condition from said condition management database and checks whether the incoming notification is to be made to the communication terminal when the responsive electronic mail for responding to said sending electronic mail was received from other terminal or device through a network,
an incoming notification means that deletes said incoming notification condition from said condition management database and makes the incoming notification for the address of the communication terminal when the incoming notification is made as a result of said checks of said decision means, and
a distribution means that distributes the receiving electronic mail when the distribution of the receiving electronic mail was requested from the communication terminal;
wherein said communication terminal comprises a condition reference means that refers to an incoming notification condition stored in said condition management database and a condition change means that changes said incoming notification condition, and
said server unit comprises a condition operation means that operates an incoming notification condition stored in said condition management database according to a request from the communication terminal.

9. The electronic mail incoming notification system according to claim 3, wherein the incoming notification condition registered in the condition management database from the communication terminal at electronic mail sending is a reply that corresponds to said sending electronic mail.

10. The electronic mail incoming notification system according to claim 8, wherein the incoming notification condition registered in the condition management database from the communication terminal at electronic mail sending is a reply that corresponds to said sending electronic mail.

11. The server unit according to claim 2, wherein the server unit comprises a means for posting contents that said server unit ought to post to the user regardless of electronic mail receiving.

12. The server unit according to claim 9, wherein the server unit comprises a means for posting contents that said server unit ought to post to the user regardless of electronic mail receiving.

13. The server unit according to claim 11, wherein the contents that the server unit ought to post to the user is a user mailbox exceeded a threshold.

14. The server unit according to claim 12, wherein the contents that the server unit ought to post to the user is the user mailbox exceeded the threshold.

15. The server unit according to claim 11, wherein the server unit posts the contents to be posted to the user together with the incoming notification.

16. The server unit according to claim 12, wherein the server unit posts the contents to be posted to the user together with the incoming notification.

17. The electronic mail incoming notification system according to claim 3, wherein the server unit comprises a means to posting the contents that said server unit ought to post to the user regardless of electronic mail receiving.

18. The electronic mail incoming notification system according to claim 10, wherein the server unit comprises a means for posting the contents that said server unit ought to post to the user regardless of electronic mail receiving.

19. The server unit according to claim 17, wherein the contents that the server unit ought to post to the user is the user mailbox exceeded the threshold.

20. The server unit according to claim 18, wherein the contents that the server unit ought to post to the user is the mailbox exceeded the threshold.

21. The server unit according to claim 17, wherein the sever unit posts the contents to be posted to the user together with the incoming notification.

22. The server unit according to claim 18, wherein the server unit posts the contents to be posted to the user together with the incoming notification.

23. A An electronic mail incoming notification method, comprising the steps of:
providing a condition management database that stores and manages an incoming notification condition set on a sending electronic mail by a communication terminal and used for deciding whether an incoming notification is made or not made when a server receives a responsive electronic mail, for responding to a said sending electronic mail and having a message ID for identifying said sending electronic mail,
detecting the incoming notification condition from the electronic mail sent from a communication terminal and storing it in said condition management database;
sending a an electronic mail received from said communication terminal to which an incoming notification condition is set by a communication terminal and a message ID has been given by said communication terminal or said server unit to another unit or terminal;
sending an electronic mail received from said communication terminal to which a message ID has been given by said communication terminal or said server unit to an other unit or terminal;
acquiring the incoming notification condition from said condition management database and checking whether the incoming notification for notifying a responsive electronic mail for responding to said sending electronic mail has been received is to be made to the communication terminal when the electronic mail was received from other terminal or device through a network;
making the incoming notification for the address of the communication terminal and deleting said incoming notification condition from said condition management database when the incoming notification is made as a result of said decision; and
distributing the receiving electronic mail when the distribution of the receiving electronic mail is requested from the communication terminal.

24. An electronic mail sending and receiving method with an incoming notification, comprising the steps of:
at the communication terminal side,
creating sending electronic mail and inputting a sending request for the electronic mail using an input means;
setting, on said sending electronic mail, an incoming notification condition used for deciding whether an incoming notification is made or not made when a responsive electronic mail, for responding to said sending electronic mail and having a message ID for identifying said sending electronic mail, is received; and
sending said sending electronic mail to which said incoming notification condition is added to an other terminal, while
at the server side that stores and manages receiving electronic mail,
providing a condition management database that stores and manages an incoming notification condition used received from said communication terminal;
detecting the incoming notification condition from the electronic mail sent from a communication terminal and storing it in said condition management database;
sending an electronic mail received from said communication terminal to which an incoming notification condition is set by a communication terminal and a message ID has been given by said communication terminal or said server unit to another unit or terminal;
sending an electronic mail received from said communication terminal to which a message ID has been given by said communication terminal or said server unit to an other unit or terminal;
acquiring the incoming notification condition from said condition management database and checking whether the incoming notification for notifying a responsive electronic mail for responding to said sending electronic mail has been received is to be made to the communication terminal when the electronic mail was received from the other terminal or device through a network;
making the incoming notification for the address of the communication terminal and deleting said incoming notification condition from said condition management database when the incoming notification is made as a result of said deciding; and
distributing the receiving electronic mail when the distribution of the receiving electronic mail was requested from the communication terminal.

* * * * *